United States Patent [19]

Mayr

[11] 4,043,649

[45] Aug. 23, 1977

[54] FADE CONTROL FOR MOTION-PICTURE CAMERA

[75] Inventor: Helmut Mayr, Taufkirchen, Germany

[73] Assignee: AGFA-Gevaert, A.G., Leverkusen, Germany

[21] Appl. No.: 664,807

[22] Filed: Mar. 8, 1976

[30] Foreign Application Priority Data

Mar. 26, 1975 Germany .............................. 2513374

[51] Int. Cl.$^2$ ............................................. G03B 21/36
[52] U.S. Cl. ................................................. 352/91 C
[58] Field of Search ................... 352/91 R, 91 C, 91 S

[56] References Cited

U.S. PATENT DOCUMENTS

| | | | |
|---|---|---|---|
| 3,517,990 | 6/1970 | McGillion | 352/91 C |
| 3,966,312 | 6/1976 | Wagensonner | 352/91 C |

*Primary Examiner*—Monroe H. Hayes

*Attorney, Agent, or Firm*—Michael J. Striker

[57] ABSTRACT

A motion-picture camera has a diaphragm whose aperture size is inversely proportional to the frequency fed to the diaphragm control servo-motor. This frequency is normally maintained between a predetermined upper limit and a predetermined lower limit. For fade out the frequency is rapidly decreased to the lower limit and thereafter regularly increased to the upper limit whereas for fade in the frequency is rapidly increased to the upper limit and thereafter regularly decreased to the lower limit. During rewind the frequency is maintained between the limits. This frequency increase and decrease can be effected by connecting oscillators of different frequency to the motor in a stepwise fashion, or by varying an impedance element of the tuned circuit of the oscillator that operates the diaphragm motor. Resistors and/or conductors strips on a control or program wheel can be used to carry out the fade out and fade in.

18 Claims, 4 Drawing Figures

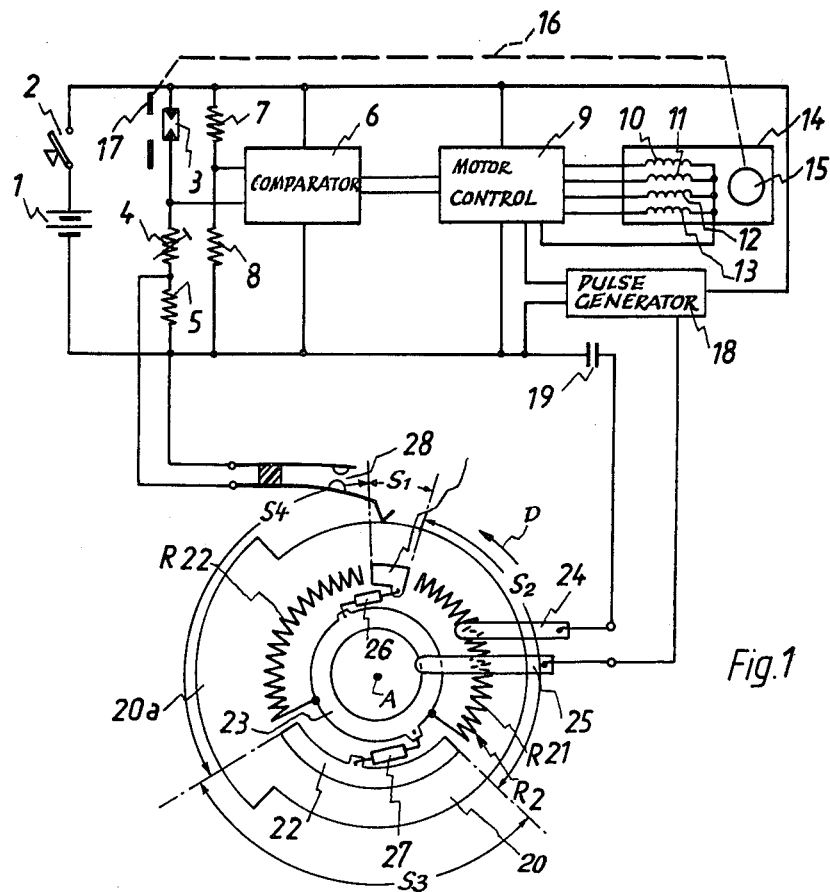
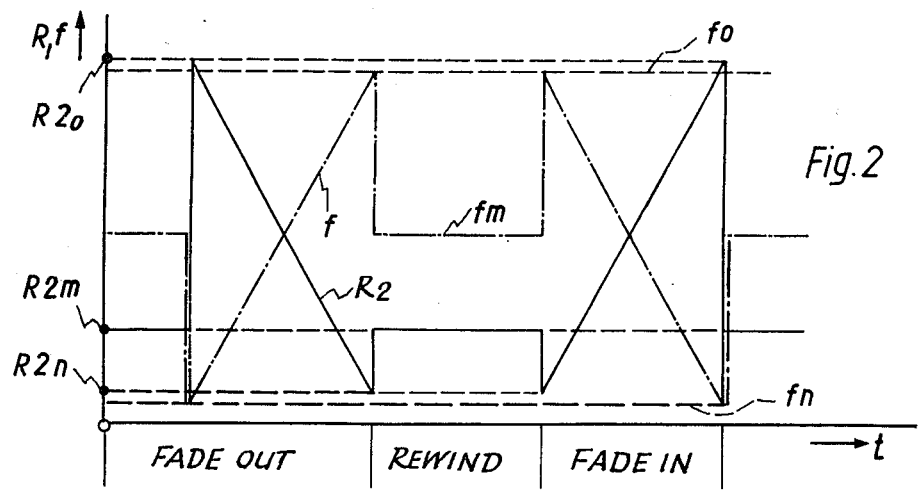

FADE CONTROL FOR MOTION-PICTURE CAMERA

BACKGROUND OF THE INVENTION

The present invention relates to a motion picture camera. More particularly this invention concerns a method of and an arrangement for controlling the diaphragm of such a camera during fade in and fade out.

A motion-picture camera is known having an automatic diaphragm control that is controlled by a light sensor provided in back of the diaphragm. The diaphragm itself is adjusted by a step motor that is driven by an oscillator, the oscillator frequency being increased to stop down the diaphragm and vice versa.

It is frequently desirable to fade in and fade out with a motion picture camera so as to avoid abrupt changes between different scenes. For fade in the diaphragm aperture must be regularly increased from a relatively small to a relatively large size. For fade out or dissolve the diaphragm aperture must be regularly stopped down. It is essential in such an operation that the film not be overexposed at maximum aperture at the end of a fade in or underexposed with the lens fully stopped down at the end of a fade-out sequence.

SUMMARY OF THE INVENTION

It is therefore an object of the present invention to provide an improved motion-picture camera.

Another object is the provision of an improved method of controlling such a camera and a control system for a camera as described above.

Yet another object is the provision of an improved motion-picture camera control system and method which allows fading-in and fading-out without over exposure and under exposure of the film in the camera.

These objects are obtained according to the present invention in a control system for a camera of the above-described general type wherein the oscillation frequency that determines the aperture size is normally maintained between a predetermined upper limit and a predetermined lower limit. Fading-out is achieved by rapidly decreasing this frequency to the lower limit and thereafter regularly increasing the frequency to the upper limit. Similarly fading-in is achieved by rapidly increasing the frequency to the upper limit and thereafter regularly decreasing the frequency to the lower limit. During rewind of the camera the frequency is maintained between these limits. Such frequency variation allows an even-light fading in a diaphragm whose blades are controlled by a cam.

In accordance with another feature of this invention the frequency is varied uniformly and linearly for fading-in and fading-out. This is achieved by varying one element of a tuned circuit in the diaphragm-control oscillator. In accordance with this invention the resistor of a series RC-tuned circuit is varied.

In accordance with such an arrangement the inclination of the frequency curve is equal to the quotient of the product of the capacity of the frequency-controlling condensor and the number of steps of the diaphragm per light level and the natural logarithm of 2. A frequency change at this rate during either fading-in or out produces a fade with a similarly linearized diaphragm that has only very little light variation.

According to another feature of this invention the frequency is varied incrementally between the upper limit and the lower limit. At each step, at least at one point in time the frequency is on the necessary curve extending between the upper and the lower frequency levels. In such arrangement the light level will nonetheless remain well within the camera's tolerances.

In accordance with this invention the control system comprises a program wheel. Separate rheostat-type and angularly off-set resistance paths may be provided on the wheel to cooperate with wipers connected with the oscillator, or several resistors can be connected via wipers to various conductive strips on the wheel. When a single resistance is provided around the wheel in contact with a single wiper the resistance between this wiper and a central point will increase as the wheel rotates, and will then decrease linearly. Between the ends of the two resistance paths where the resistance increases and decreases segments of constant resistance are provided.

BRIEF DESCRIPTION OF THE DRAWING

FIG. 1 is a schematic view of a camera control system in accordance with this invention;

FIG. 2 is a graph illustrating operation of the system of FIG. 1; and

DESCRIPTION OF THE PREFERRED EMBODIMENTS

Figure 3:
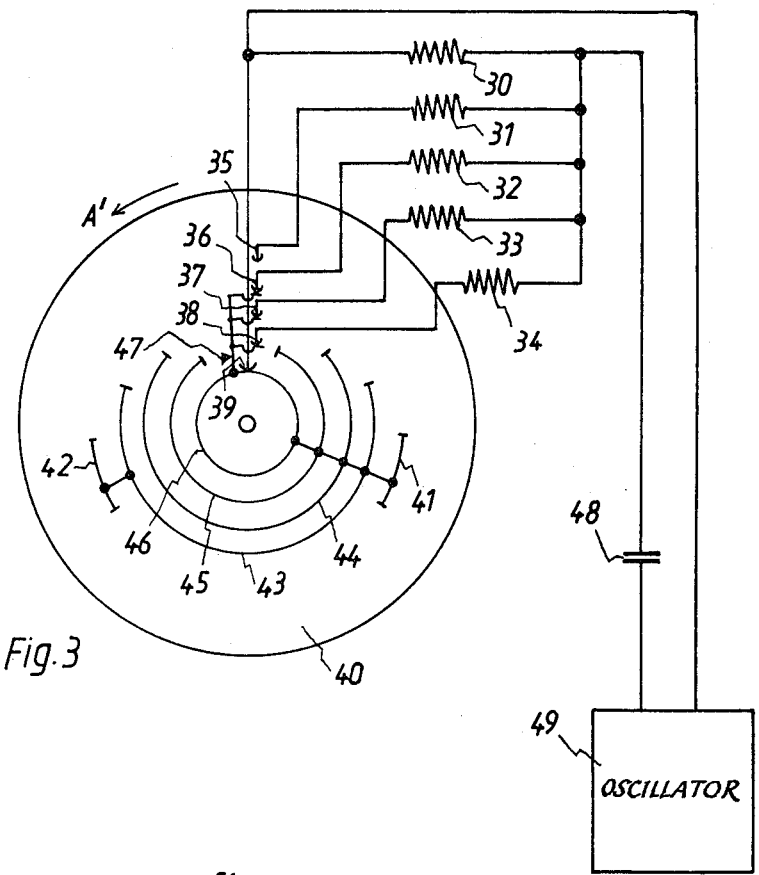
FIGS. 3 and 4 are schematic views of other arrangements in accordance with this invention.

The arrangement as shown in FIG. 1 has a power source constituted as a battery 1 in series with which there is provided an on-off switch 2. A photo-resistor 3 whose internal resistance varies in proportion to the light falling on it is provided behind the diaphragm 17 of the camera. This photo resistor 3 is connected in series with a potentiometer 4 and a fixed resistor 5 across the power source 1 so as to form a voltage-dividing network that is connected to one input of a comparator 6. The other input of this comparator 6 is connected to another voltage-dividing network formed by a pair of fixed resistors 7 and 8 also connected across the power supply 1. The output of this comparator 6 is fed to a step-motor control 9 whose output side in turn is connected to the four windings 10, 11, 12 and 13 of step motor 14 having a permanent-magnet armature 15 connected as shown at 16 to the diaphragm 17. Thus the comparator 6 compares two voltage levels, one determined by the fixed-resistance network 7 and 8 and corresponding to the set point of the system and an actual-value input which is varied by the photoresistor 3. As the photoresistor 3 detects inadequate light a corresponding signal is fed by the comparator 6 to the motor control 9 and the motor 14 is operated to open up the diaphragm and vice versa.

In addition, a pulse generator 18 of the Schmitt trigger type is provided connected to the motor control 9 and having a RC-tuned circuit formed by a capacitor 19 and a resistor $R_2$.

A program wheel 20 is divided into four sectors $S_{1-4}$. The first sector $S_1$ has a short contact strip 21 to which one side of a resistor 26 is connected whose other side is connected to a central circular contact strip 23. The sector $S_2$ has a resistance strip R21 which relative to the rotation direction D of the wheel 20 has a trailing edge connected to the inner ring 23. The sector $S_3$, which is substantially greater in arc length than the sector $S_1$, has a conductive strip connected to one side of a resistor 27 whose other side is also connected to the central ring 23. Finally the sector $S_4$ has another resistive strip R22 whose leading edge only is connected to the inner ring 23. Resistors 26 and 27 are of like resistance R2m. Resistances R21 and R22 can vary between a maximum level equal to R20 and a minimum level R2n above and below R2m, respectively.

A wiper 24 continuously rides on the trails formed by the resistors R21 and R22 and strips 21 and 22 and the central ring 23 is continuously contacted by another wiper 25.

In addition the disc 20 is provided with a lobe 20a that coacts with a normally open switch 28 connected in a shunt across one of the resistors 5 of the first voltage divider network. The switch 28 is open during the stopping-down or fade-out phase and during rewind. During the fading-in phase and the starting position of the wheel 20 the switch 28 is held closed. Thus when the contact 24 is in sector $S_1$ and $S_4$ the switch 28 is closed.

Thus with reference to FIG. 2 at the start of the operation the wiper 24 rests on the strip 21 so that the resistor 26 is in series with the capacitor 19. Thus the resistance R2 is equal to R2m and the frequency to $fm$. As the fade-out phase starts the resistance jumps rapidly to the lever R20 and the frequency drops rapidly to the level $fn$. Thereafter with continued rotation of the wheel 20 in direction D the resistance decreases linearly to R2n and the frequency increases linearly to $fo$. In the subsequent rewind phase the resistance jumps back up to R2m as the wiper comes onto the strip 22 and the frequencies correspondingly drops to the normal level $fm$. For fade-in the resistance drops down to its minimum level R2n and then increases linearly to the level R2o with the frequency similarly moving from maximum level $fo$ to minimum levels $fn$. The change rate of the resistance R2 is equal to the quotient of the natural logarithm of 2 and the product of the capacity of the time-determining condensor 19 and the number of steps of the aperture diaphragm per light level. Thus a linearized diaphragm with equally large angular steps per light step may be employed.

The arrangement of FIG. 3 has resistors 30-34 connectable in parallel with each other and in series with a capacitor 48 of motor-control oscillator 49. A dielectric wheel 40 is provided having conducting tracks 41-47 all electrically connected to each other and arranged with various wipers 35, 36, 37 and 38 connectable to the resistors 31, 32, 33, and 34, respectively. A wiper 39 from the resistor 30 is connected to the innermost ring 46 of the conductive tracks.

The wheel 40 is rotated in the direction indicated by arrow A' from the starting position illustrated in FIG. 3 with wipers 36, 37, and 38 all lying on the conductive track so that resistors 32, 33 and 34 are connected in parallel to the resistor 30 and the overall resistance R2 in series with the condensor 48 is decreases considerably. Slight rotation disconnects all of these resistors except the resistor 30 from in series with the capacitor until the wiper 38 rides up onto the track 45, thereby decreasing the resistance slightly. Continued rotation causes the wiper 37 to ride onto the track 44, then the wiper 36 onto the track 43 and finally the wiper 35 onto the track 41, putting all five resistors in parallel and thereby reducing the overall resistance to the lowest possible point. During the subsequent rewind phase the wiper 35 comes off the track 41 so that only resistors 30, 32, 33 and 34 are in parallel. For fading-in the wiper 35 rides back up onto another track 42 to put all five resistors in series, then resistor 31 is cut out, then the resistor 32, the resistor 33, and the resistor 34 leaving only the resistor 30 in series with the capacitor 48 so that the resistance is maximized and the frequency is minimized.

With this system the diaphragm control with normal lighting is carried out with a predetermined intermediate frequency and fade out takes place starting from a lower frequency than in normal lighting to a greater frequency than with normal lighting. During the fading-in the diaphragm control is effected with a frequency going down to a low frequency.

Figure 4:
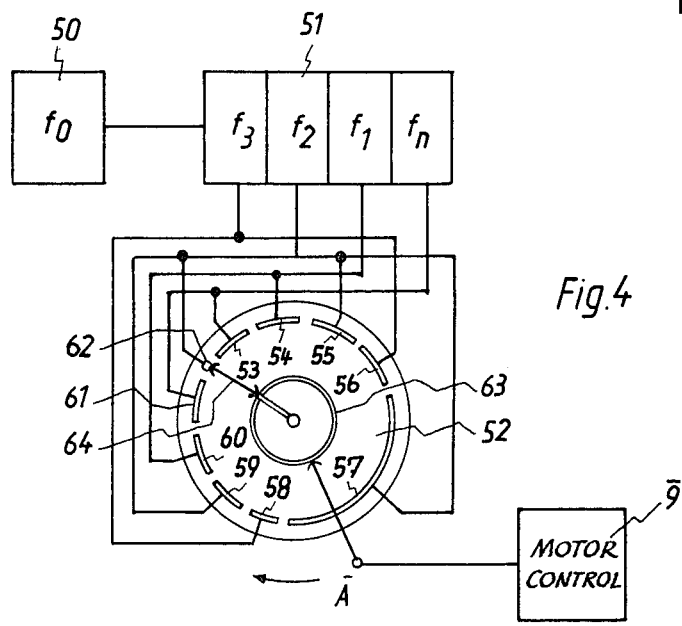

FIG. 4 shows an arrangement having a frequency generator or oscillator 50 whose output frequency $f_0$ is substantially higher than any of the four output frequencies $f_{3,2,1,}$ and $_n$ of a frequency reducer 51, the frequency $f_n$ being the lowest frequency. The four stages of the unit 51 are connected to contact strips 53 to 63 on a program wheel 52, these strips 53 to 62 being arranged in a circle outside the continuous strip 63. A contact 64 rotates around on the wheel 52 and connects the inner ring 63 to any of the outer segments 52 to 62 during rotation of the program wheel 52 in the direction $\overline{A}$. A motor-control $\overline{9}$ is connected to the inner track 63.

As the wheel 52 rotates the motor control circuit $\overline{9}$ is connected to the various oscillators to step it in frequency in accordance with the diagram of FIG. 2.

It will be understood that each of the elements described above, or two or more together, may also find a useful application in other types of applications differing from the types described above.

While the invention has been illustrated and described as embodied in a motion-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion-picture camera capable of producing fadeover effects, in combination, an adjustable diaphragm; a stepper motor coupled to the diaphragm; a train or motor input pulses having a pulse-repetition frequency; a stepper motor control circuit connected to the pulse-generating means and the stepper motor and operative for causing the stepper motor to perform a step-by-step change of the diaphragm aperture size, one step per motor input pulse; fadeover means connected to the stepper motor control circuit and effecting a fade-out operation by causing the stepper motor to perform a step-by-step decrease of the diaphragm aperture size at a rate corresponding to said frequency, a film rewind operation, and a fade-in operation by causing the stepper motor to perform a step-by-step increase of the diaphragm aperture size at a rate corresponding to said frequency; and frequency-control means operative during the performance of the fade-out operation for progressively increasing said frequency and operative during the performance of the fade-in operation for progressively decreasing said frequency.

2. In a motion-picture camera as defined in claim 1, the frequency-control means comprising means operative during the performance of the fade-out operation for progressively increasing said frequency from a lower value to a higher value, operative during the performance of the fade-in operation for progressively decreasing said frequency from a higher value to a lower value, and operative during the performance of the film rewind operation for maintaining said frequency at a value intermediate said lower and higher values.

3. In a motion-picture camera as defined in claim 2, wherein said lower values are equal to each other, and wherein said higher values are equal to each other.

4. In a motion-picture camera as defined in claim 1; further including light-measuring means connected to the stepper motor control circuit and operative during normal camera operation for applying to the stepper motor control circuit light-dependent signals causing the stepper motor to effect light-dependent step-by-step changes of the diaphragm aperture size, the frequency-control means comprising means operative during normal camera operation for maintaining said frequency at a predetermined normal value, whereby automatic diaphragm aperture size adjustments not occurring during fadeover operations will be performed by the stepper motor at a rate corresponding to the normal frequency value, means operative at the start of the fade-out operation for quickly reducing said frequency to a value below said normal value and then during the performance of the fade-out operation, progressively increasing said frequency to a value higher than said normal value, and means operative during the performance of the fade-in operation for progressively decreasing said frequency from a value higher than said normal value to a value lower than said normal value.

5. In a motion-picture camera as defined in claim 4, the frequency-control means further including means operative upon completion of the fade-out operation for quickly decreasing said frequency to said normal value, maintaining said normal value during the film rewind operation, and upon completion of the film rewind operation quickly increasing said frequency to a value higher than said normal value.

6. In a motion-picture camera as defined in claim 1; further including light-measuring means connected to the stepper motor control circuit and operative during normal camera operation for applying to the stepper motor control circuit light-dependent signals causing the stepper motor to effect light-dependent step-by-step changes of the diaphragm aperture size, the frequency-control means comprising means operative during normal camera operation for maintaining said frequency at a predetermined normal value, whereby automatic diaphragm aperture size adjustments not occurring during fadeover operations will be performed by the stepper motor at a rate corresponding to the normal frequency value, means operative at the start of the fade-out operation for quickly reducing said frequency to a first value lower than said normal value and then during the performance of the fade-out operation, progressively increasing said frequency to a second value higher than said normal value, means operative at the completion of the fade-out operation for quickly reducing said frequency from said second value to said normal value and operative for maintaining said frequency at said normal value during the film rewind operation, and means operative at the start of the fade-in operation for quickly increasing said frequency from said normal value to said second value, then during the performance of the fade-in operation progressively decreasing said frequency from said second value to said first value, and upon completion of the fade-in operation quickly increasing said frequency from said first value to said normal value.

7. In a motion-picture camera as defined in claim 5, the frequency-control means comprising an oscillator circuit provided with a frequency-determining capacitor, the frequency-control means comprising means operative for effecting the progressive frequency increase and the progressive frequency decrease at a constant rate of change of frequency equal to the quotient of two terms, one term being the natural logarithm of two, the other term being the product of a first term and a second term, the first term being the capacitance of said capacitor, the second term being the number of steps of the diaphragm per light level.

8. In a motion-picture camera as defined in claim 5, the frequency-control means comprising means for effecting the progressive frequency increase and the progressive frequency decrease in a stepwise fashion approximating to a constant rate of change of frequency.

9. In a motion-picture camera as defined in claim 5, the frequency-control means including an oscillator provided with frequency-determining resistor means, the frequency-determining resistor means comprising a rotating program wheel provided with a plurality of resistor segments and cooperating stationary wipers operative producing during the rotation of the wheel a linear resistance decrease resulting in the progressive frequency increase and a linear resistance increase resulting in the progressive frequency decrease.

10. In a motion-picture camera as defined in claim 8, the frequency-control means including an oscillator provided with frequency-determining resistor means, the frequency-determining resistor means comprising a plurality of frequency-determining resistors, a rotating program wheel provided with a plurality of electrically conductive and non-conductive tracks, and wipers riding on the tracks and connecting the frequency-determining resistors to the oscillator and disconnecting them therefrom in a predetermined succession.

11. In a motion-picture camera as defined in claim 5, the frequency-control means including an oscillator operative for producing a train of pulses having a constant pulse-repetition frequency, a plurality of frequency-reducing stages each having an input connected to the output of the oscillator for producing output pulse trains of different respective pulse-repetition frequency, and means operative for applying different ones of the output pulse trains to the stepper motor control circuit during the fade-out, film rewind and fade-in operations.

12. In a motion-picture camera capable of producing a fade-out effect, in combination, an adjustable diaphragm; a stepper motor coupled to the diaphragm; pulse-generating means operative for generating a train or motor input pulses having a pulse-repetition frequency; a stepper motor control circuit connected to the pulse generating means and the stepper motor and operative for causing the stepper motor to perform a step-by-step change of the diaphragm aperture size, one step per motor input pulse; fade-out means connected to the stepper motor control circuit and operative for effecting a fade-out operation by causing the stepper motor to perform a step-by-step decrease of the diaphragm aperture size at a rate corresponding to said frequency; and frequency-control means operative during the performance of the fade-out operation for progressively increasing said frequency.

13. In a motion-picture camera as defined in claim 12, further including light-measuring means connected to the stepper motor control circuit and operative during normal camera operation for applying to the stepper motor control circuit light-dependent signals causing the stepper motor to effect light-dependent step-by-step changes of the diaphragm aperture size, the frequency control means comprising means operative during normal camera operation for maintaining said frequency at a predetermined normal value, whereby automatic diaphragm aperture size adjustments not occurring during fade operations will be performed by the stepper motor at a rate corresponding to the normal frequency value, and means operative at the start of the fade-out operation for quickly reducing said frequency from said normal value to a value below said normal value and then during the performance of the fade-out operation, progressively increasing said frequency to a value higher than said normal value.

14. In a motion-picture camera as defined in claim 13, the frequency-control means further including means operative upon completion of the fade-out operation for quickly reducing said frequency from said higher value to said normal value.

15. In a motion-picture camera capable of producing a fade-in effect, in combination, an adjustable diaphragm; a stepper motor coupled to the diaphragm; pulse-generating means operative for generating a train of motor input pulses having a pulse-repetition frequency; a stepper motor control circuit connected to the pulse generating means and the stepper motor and operative for causing the stepper motor to perform a step-by-step change of the diaphragm aperture size, one step per motor input pulse; fade-in means connected to the stepper motor control circuit and operative for effective fade-in operation by causing the stepper motor to perform a step-by-step increase of the diaphragm aperture size at a rate corresponding to said frequency; and frequency-control means operative during the performance of the fade-in operation for progressively decreasing said frequency.

16. In a motion-picture camera as defined in claim 15, further including light-measuring means connected to the stepper motor control circuit and operative during normal camera operation for applying to the stepper motor control circuit light-dependent signals causing the stepper motor to effect light-dependent step-by-step changes of the diaphragm aperture size, the frequency control means comprising means operative during normal camera operation for maintaining said frequency at a predetermined normal value, whereby automatic diaphragm aperture size adjustments not occurring during fade operations will be performed by the stepper motor at a rate corresponding to the normal frequency value, and means operative at the start of the fade-in operation for quickly increasing said frequency from said normal value to a value higher said normal value and then during the performance of the fade-out operation, progressively decreasing said frequency to a value lower than said normal value.

17. In a motion-picture camera as defined in claim 16, the frequency-control means further including means operative upon completion of the fade-in operation for quickly increasing said frequency from said lower value to said normal value.

18. A method of producing a fade-over effect using a motion-picture camera capable of producing fade-over effects, the motion-picture camera being of the type comprising an adjustable diaphragm, a stepper motor coupled to the diaphragm, pulse-generating means operative for generating a train of motor input pulses having a pulse-repetition frequency, a stepper motor control circuit connected to the pulse-generating means and the stepper motor and operative for causing the stepper motor to perform a step-by-step change of the diaphragm aperture size, one step per motor input pulse, and fadeover means connected to the stepper motor control circuit and operative when activated for effecting a fade-out operation by causing the stepper motor to perform a step-by-step decrease of the diaphragm aperture size at a rate corresponding to said frequency, a film rewind operation, and a fade-in operation by causing the stepper motor to perform a step-by-step increase of the diaphragm aperture size at a rate corresponding to said frequency, the method comprising the steps of progressively increasing said frequency during the performance of the fade-out operation and progressively decreasing said frequency during the performance of the fade-in operation.

* * * * *